June 9, 1959 M. NIRENBERG 2,889,949
ICE CREAM DISPENSING APPARATUS
Filed Nov. 29, 1956 3 Sheets-Sheet 1
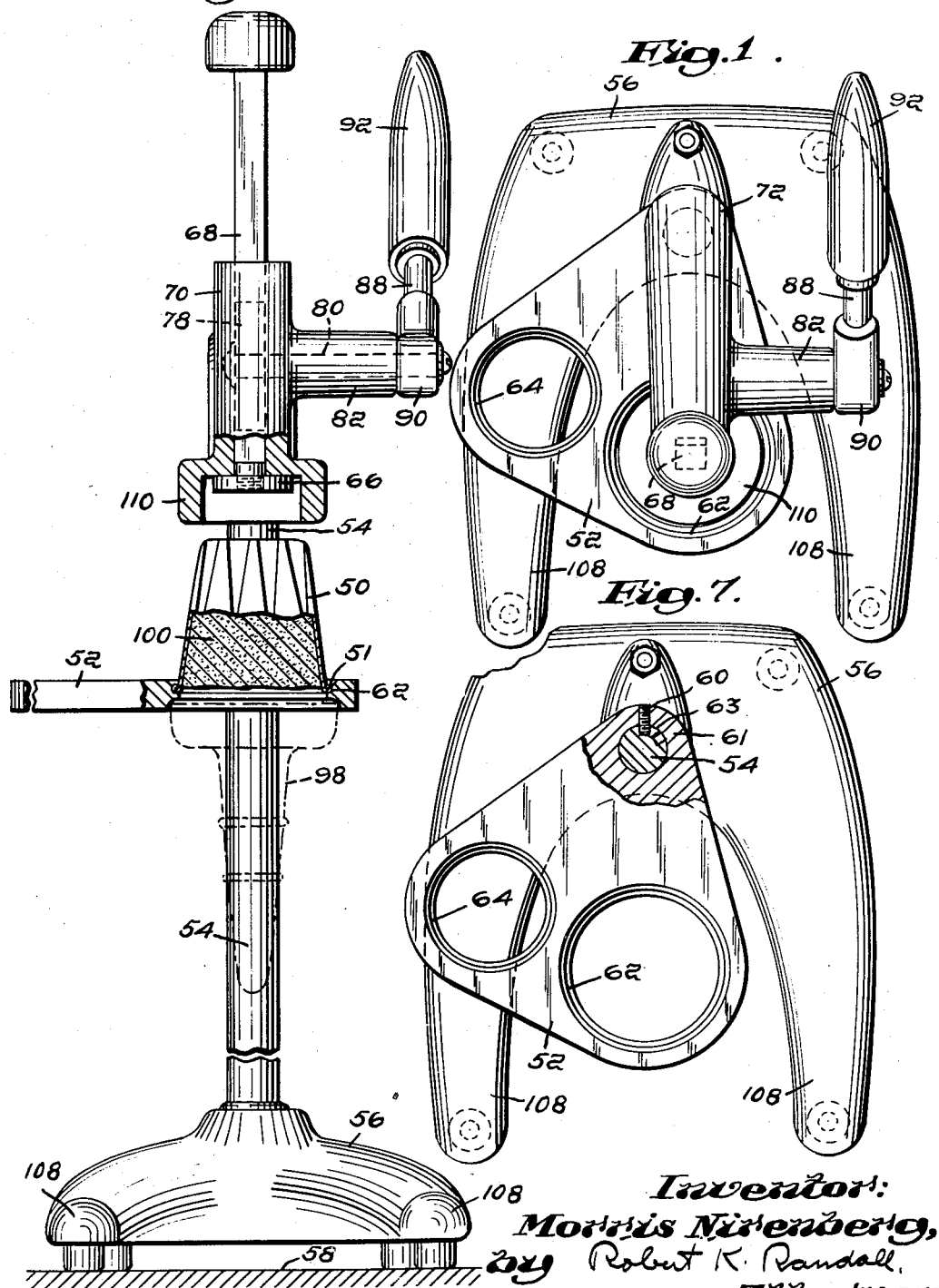
Inventor:
Morris Nirenberg,
By Robert K. Randall,
Attorney June 9, 1959 M. NIRENBERG 2,889,949
ICE CREAM DISPENSING APPARATUS
Filed Nov. 29, 1956 3 Sheets-Sheet 2

Inventor:
Morris Nirenberg,
by Robert K. Randall.
Attorney

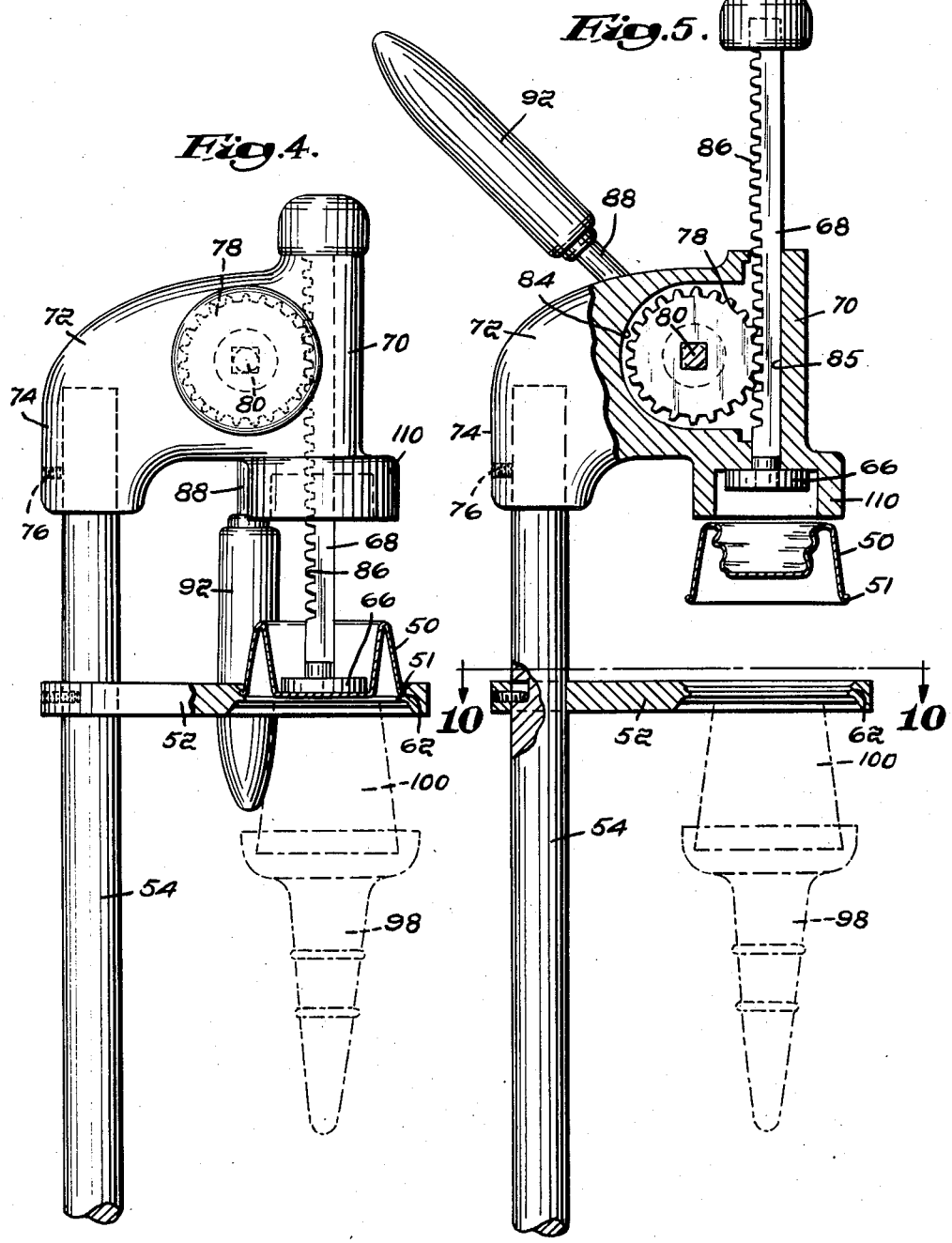

United States Patent Office 2,889,949
Patented June 9, 1959

2,889,949
ICE CREAM DISPENSING APPARATUS

Morris Nirenberg, West Medway, Mass.

Application November 29, 1956, Serial No. 625,191

1 Claim. (Cl. 214—310)

This invention relates to the dispensing of foodstuffs, and in particular to the dispensing of ice cream and other confections.

The prevailing method of dispensing ice cream is to dip it from bulk containers of 2½ to 5 gallons capacity, in which it is packed and delivered by the manufacturer and kept in refrigerated cabinets, by means of scoops of indefinite capacity with which the ice cream is transferred to the cone, dish, cup, slice of pie or cake, or other receptacle for immediate consumption. In the case of ice cream being packed for transport, a paddle is used to dip the ice cream from the bulk package and pack it into the carton in which it is to be carried. In both cases, as is well known in the trade, the use of the scoop or paddle inevitably compresses and compacts the ice cream in the bulk container with the result that the total bulk or volume of the portions dispensed and paid for never equals the volume purchased by the retailer, with attendant serious loss of profit as a result of such shrinkage.

Further, it is difficult if not impossible to manipulate the scoop so as to attain a uniform quantity or weight of ice cream at each delivery. Especially in unskilled or careless hands, these variations often cost the retailer either his legitimate profit if too generous or the loss of the customer's good will if too scanty. Added to this, the use of the scoop or paddle is open to serious criticism from the sanitary viewpoint. Another source of annoyance to the customer in dispensing filled ice cream cones is that the fringe of ice cream from an over-filled or off-center scoop protrudes beyond the lip of the cone to drip onto the hands or clothing of the purchaser before it can be eaten.

The present invention aims to overcome these drawbacks and shortcomings of the existing practice and means of dispensing ice cream and other confections and to these ends it provides novel means for packaging and dispensing ice cream, through superseding the bulk packaging of this product by the method of packing it in individual containers each holding a predetermined portion, weight, or volume, and providing novel devices for delivering such portion in full from the individual container directly into the cone, dish, cup, or other receptacle, or onto the pie, cake, pudding, or other foodstuff, or into another container for transport, without any handling or contact with the contents either by implements or manually.

Thus, in its preferred form, the invention consists in packaging the predetermined individual quantities or units of ice cream in open-ended containers, collapsible or otherwise, and providing mechanical means for instantly and completely expelling the ice cream therefrom into the cone, dish, cup or other container or to the foodstuff which is to receive it, or alternatively into the carton or other receptacle in which it is to be carried from the premises where sold.

Preferably also the individual packaging containers will be of frusto-conical shape so that the expelling means will thrust the closed end of the container inwardly into the latter, i.e., turn it partway inside out, so that with the container in upside down position and supported by its rim, the entire serving will fall freely of its own weight when freed from contact with the flaring side walls of the container by reason of the taper as soon as relative movement occurs.

Cheap and disposable containers adapted to the practice of the invention are readily available in the form of the wax paper individual drinking cups widely sold under various trade names, as for example "Lily" and "Dixie" cups, and machines for automatically filling them rapidly with ice cream or other confections are already known and used. As is obvious, through the invention the loss to the retailer through compression of the ice cream in bulk containers is entirely eliminated. Compression of the individual portions dispensed by the invention apparatus is avoided or materially reduced, thus attaining greater eye appeal through both appearance and reality of delivery of the full measure of ice cream expected by the purchaser. Completely sanitary handling of the ice cream is attainable from the freezer to the consumer's hands since no contact with hands or hand-held implements occurs. The individual packages are packed and delivered in cartons in inverted relation, open end down, so that dust and dirt entering the retailer's ice cream cabinet when the lid is opened cannot settle on the contents of the packages.

No training or experience is needed to teach the use of the apparatus. In fact, the invention makes possible self-service by the customer, who selects the desired package from a refrigerated cabinet, picks a cone from an adjacent rack or a slice of pie or cake from the shelf, holds it in delivery position beneath the package which he has placed on the ejecting device, and expels the contents into the cone or onto the food. Self-service of ice cream into a sundae cup is similarly effected. Delivery of the packages through automatic vending machines, for use in conjunction with the ejecting device, is also contemplated.

Other objects and advantages of the invention, and the manner of their attainment are obvious as will be made plain hereinafter.

Illustrative embodiments of the invention are shown in the accompanying drawings, in which Figs. 1 and 2 are plan and front elevational views, respectively, of the dispensing device, the latter showing an individual serving of ice cream in its container in dispensing position on the device.

Fig. 4 is a side elevation of the parts in the relationship shown in Fig. 3.

Fig. 5 is a side elevation of the parts as the plunger is raised to strip the empty cup therefrom.

Fig. 7 is a plan view partly in section on line 10—10 of Fig. 5.

Figure 3:
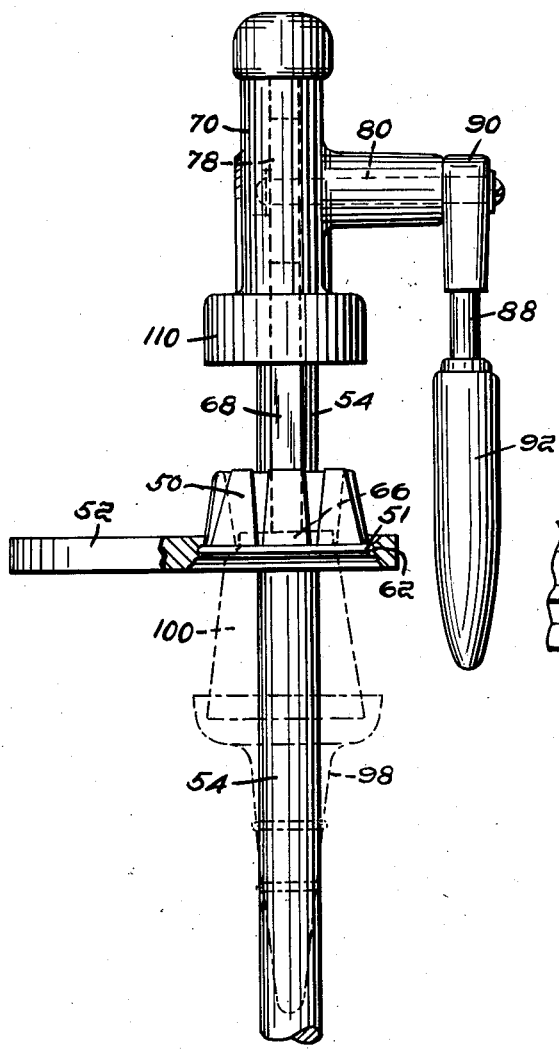
Fig. 3 is a fragmentary front elevation similar to Fig. 2 showing the relation of the parts and the container at the completion of the dispensing operation.

The form of dispensing device shown in Figs. 1 to 7 is primarily designed for soda-fountain use for the dispensing of ice cream packed in paper cups of the general shape indicated at 50, and of either 1-piece or 2-piece construction. A package-supporting member 52 is mounted on a standard 54 fixed in vertical relation on a base 56 of relatively heavy weight and horseshoe shape, to stand on a table or counter 58. The support 52 is maintained at suitable elevation above the base by a stop screw 60 threaded through the heel 61 of support 52 and entering a segmental slot 63 extending partway around the circumference of standard 54. Support 52 preferably has two or more circular apertures 62, 64, of different diameters formed therein with their centers equidistant from the axis of standard 52. The ends of the slot are notched downwardly to hold the end of the stopscrew and thus maintain either of the two apertures 62, 64, coaxial with a piston 66. Extension of the slot circumferentially, with additional notches, is resorted to when more than two sizes of apertures are to be provided in the swinging supporting member 52. Each aperture fits the rim 51 or mouth diameter of a different size of package 50, so that both or all sizes may be handled by the same dispenser.

The piston 66 is fixed on the lower end of a rectangular plunger 68 sliding freely in a rectangular passage 85 in a hub 70 vertically disposed with its axis parallel to standard 54, formed in a housing 72 mounted by hub 74 on the standard 54 in fixed relation by means of its set screw 76.

This housing contains a pinion gear 78 fixed on the squared end of a short shaft 80 mounted rotatably in a hub 82 on one side of the housing. The gear is in a recess 84 which communicates with the interior of the hub 74, and meshes with a rack 86 on one side of the plunger. A lever 88 is fixed by means of its hub 90 and a retaining screw on the protruding squared end of shaft 80, and is equipped with a handle 92 to rotate the pinion and lift and lower the plunger and its piston.

Figure 6:
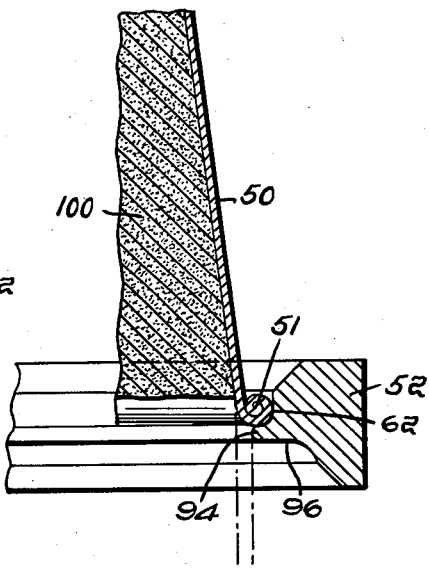
Fig. 6 is an enlarged vertical section through portions of the ice cream package and its support when the package is in dispensing position.

Each aperture 62, 64, of supporting member 52 has an inwardly protruding ledge 94, Fig. 6, for the support of the rim 51 of the cup or other container in which the ice cream is packaged, the aperture through the lip which forms this ledge substantially equalling or slightly exceeding the diameter of the mouth of the cup placed upside down thereon. Beneath this lip is a rabbet 96 with a bevelled wall which serves to receive and center the mouth of a manually held ice cream cone 98 on the common axis of the aperture, plunger and cup, so as to properly receive the serving 100 of ice cream from the cup.

The diameter of piston 66 is such that when it is brought down by manipulation of the handle onto the bottom of a cup or other container of frustro-conical shape resting upside down on ledge 94 the bottom of the cup is thrust downward within the walls of the cup as shown in Figs. 3, 4 and 5 and expels the contents 100, with attendant progressive rolling of the cup walls as the bottom descends. In this way the cup is inverted, turned inside out, for a part of its height.

Since the content of the cup has the same truncated cone shape as the cup, at normal storage temperatures it separates from the cup wall as soon as it starts downward, the space between the wall and the content increasing rapidly by reason of the matching taper of both surfaces. As already noted, the piston at room temperature melts the ice cream loose from the cup bottom, so that the weight of the mass causes it to drop freely through the aperture 62 or 64 into the receiving cup, dish, cone, foodstuff, or other receptacle. The plunger's full stroke is made greater than the height of the tallest package. As much of the stroke as desired may be used to seat the mass of ice cream securely in the mouth of a cone 98. The reduced area of the expelling surface, the bottom of the waxed cup, attained through using a cone-shaped container, cuts to a minimum the surface to which the ice cream could cling.

The horseshoe shape of the base facilitates the placing of a bowl or dish on the counter between its legs 108 to catch any drip, cone fragments, or the like droppings.

After delivery has been made, the handle is moved reversely to raise the plunger and piston, whereupon as shown in Fig. 5 the empty half-inverted cup is stripped from the piston by encountering the skirt 110 into which the piston recedes.

Because the tapered cups of the packages are not filled to the brim, the greatest diameter of the contents is materially less than that of the appropriate aperture in support 52 through which it passes, and hence there is little or no chance of contact of the parts of the support with the ice cream, the ledge 94 being shielded by the cup rim 51. When such does occur, as at the ledge, it is easily removed by wiping with a damp cloth, the fillets in the rabbets forming the ledge and the undercut cone-guide at the under side facilitating easy cleaning.

It is further contemplated in certain instances to prepare the ice cream packages dispensed by the novel means by first placing a quantity of syrup or sundae sauce in the bottom of the cup and then filling the rest of the space within the cup with ice cream in a semi-solid condition. Thereupon the whole is frozen. Upon ejection in the manner described, the ice cream is deposited into a wide-mouthed ice cream cone with the syrup or sauce on top of the ice cream, creating a sundae cone. The syrup or sauce, melting more rapidly than the ice cream upon exposure to room temperature, flows down over the ice cream in conventional manner of serving such confections. The cup contents may of course be deposited in a sundae cup if desired, to create a ready made sundae.

While I have illustrated and described a preferred form in which the invention may be embodied, I am aware that many modifications may be made therein by any person skilled in the art, without departing from the scope of the invention as expressed in the claim. Therefore, I do not wish to be limited to the particular form shown, or to the details of construction thereof, but what I do claim is:

A dispenser for ice cream packed in tubular containers having in combination an elevated supporting member having a plurality of openings of different diameters for the discharge therethrough of the contents of tubular containers supported by such member with their open ends down in register with such openings, a plunger expelling the contents from a container so supported, and means providing a predetermined degree of lateral movement of the supporting member to permit optionally disposing the plunger and a selected one of such openings in coaxial relation.

References Cited in the file of this patent

UNITED STATES PATENTS

| | | |
|---|---|---|
| 1,197,211 | Kennedy | Sept. 5, 1916 |
| 1,412,727 | Walsh | Apr. 11, 1922 |
| 1,481,700 | Fatland | Jan. 22, 1924 |
| 1,494,982 | Sides | May 20, 1924 |
| 1,579,612 | Hoffman et al. | Apr. 6, 1926 |
| 1,597,950 | Baynes | Aug. 31, 1926 |
| 1,738,814 | Baynes | Dec. 10, 1929 |